United States Patent [19]
Hotta

[11] Patent Number: 5,291,292
[45] Date of Patent: Mar. 1, 1994

[54] IMAGE SENSOR AND METHOD OF DRIVING THE SAME

[75] Inventor: Hiroyuki Hotta, Kanagawa, Japan

[73] Assignee: Fuji Xerox Co., Ltd., Tokyo, Japan

[21] Appl. No.: 772,779

[22] Filed: Oct. 7, 1991

[30] Foreign Application Priority Data

Jan. 11, 1991 [JP] Japan ................. 3-012605

[51] Int. Cl.$^5$ ................. H04N 3/14; H04N 5/335
[52] U.S. Cl. ................. 348/308; 358/482; 250/578.1
[58] Field of Search ................. 358/213.11, 213.13, 358/213.15, 213.18, 213.19, 213.31; 250/578.1; 257/231, 233, 234

[56] References Cited

U.S. PATENT DOCUMENTS 4,763,197  8/1988  Masuda ................. 358/213.16
5,198,905  3/1993  Miyake ................. 358/213.31

FOREIGN PATENT DOCUMENTS 63-9358  1/1988  Japan .

OTHER PUBLICATIONS

Applicant's Submitted Prior Art ("Background of the Invention").
Applicant's "Discussion of Related Art".

Primary Examiner—Joseph Mancuso
Assistant Examiner—Wendy R. Greening
Attorney, Agent, or Firm—Finnegan, Henderson, Farabow, Garrett & Dunner

[57] ABSTRACT

An image sensor having an array including a plurality of linearly arranged blocks each consisting of an n number of photodetecting elements, switching elements respectively connected in series to the photodetecting elements, control wires, provided respectively in connection with the blocks, for turning on the switching elements for each block, and signal transfer wires connected to a drive IC for signal detection, whereby charges generated by the photodetecting elements are transferred, every block, to wiring capacitances of the signal transfer wires for signal detection. In the image sensor, the control wires are laid out crossing the signal transfer wires with an interlayer insulating film layered therebetween, and at least one dummy control wire is laid out crossing the signal transfer wires through the interlayer insulating film. A pulse is applied to the dummy control wire before gate pulses are applied to the control wires.

8 Claims, 4 Drawing Sheets

IMAGE SENSOR AND METHOD OF DRIVING THE SAME

BACKGROUND OF THE INVENTION

1. Field of the Invention

The present invention relates to an image sensor used for a facsimile, scanner, and the like. More particularly, the present invention relates to a structure and a drive method for reducing a variation in the output signals among blocks each consisting of a plurality of photodetecting elements in an image sensor of the type in which signals of photodetecting elements are detected every block by a matrix drive system using switching elements connected to the photodetecting elements.

2. Discussion of the Related Art

Conventionally, a facsimile, for example, employs a close-contact type image sensor for converting the image information on a document original that is projected in one-to-one correspondence manner, into electrical signals. There has been proposed an image sensor of a TFT drive type. In the image sensor, the projected image is divided into a great number of picture elements (pixels), which respectively correspond to photodetecting elements. The charges generated by the respective photodetecting elements are temporarily stored into wire capacitors in every block by using switching elements such as thin film transistors (TFTs). The stored charges are time-sequentially read out in the form of electrical signals at a speed in the range of several hundred kHz to several MHz, by a drive IC. In this type of image sensor, the image read operation can be performed by using a single drive IC, through a matrix operation using the switching elements. Therefore, the number of drive ICs for driving the image sensor may be reduced.

The TFT drive image sensor, as shown in FIG. 5 showing an equivalent circuit of the image sensor, includes a linear photodetecting-element array 101 consisting of a plurality of photodetecting elements $P_{k,n}$ linearly arrayed and having a length substantially equal to the width of a document, a charge transfer section 102 consisting of a plurality of thin film transistors $T_{k,n}$ provided in association with the photodetecting elements $P_{k,n}$ in one-to-one correspondence, and matrix-arrayed signal transfer wires 103 constructed with a thin film structure.

The photodetecting element array 101 is divided into photodetecting element groups as "k" number of blocks. The "n" number of photodetecting elements $P_{k,n}$ forming one group may be each equivalently expressed by a photo diode PD and a parasitic capacitance Cp. The photodetecting elements $P_{k,n}$ are respectively connected to the drain electrodes of the switching elements $T_{k,n}$. The source electrodes of the switching elements $T_{k,n}$ are respectively connected, every group of photodetecting elements, to the "n" number of common signal lines 104 through the signal transfer wires 103. The common signal lines 104 are connected to a drive IC 105. The gate electrodes of the switching elements $T_{k,n}$ are connected to a TFT controller 106 through control wires Gk so that the elements are rendered conductive every block. The control wires Gk are formed on an interlayer insulating film (not shown) that is formed on the signal transfer wires 103.

The optical charges generated in the photodetecting elements $P_{k,n}$ are stored, for a predetermined period of time, in the parasitic capacitance of each photodetecting element $P_{k,n}$ and the overlap capacitance CGD between the drain and gate of each switching element $T_{k,n}$. Then, the charges are redistributed, every block, to the wiring capacitance CL of the signal transfer wires 103 and the overlap capacitance CGS between the source and gate of each switching element $T_{k,n}$, by using the switching elements $T_{k,n}$ as charge transfer switches.

A gate pulse $\Phi G1$ is transferred from the TFT controller 106, through the control wire G1 to the switching elements $T_{1,1}$ to $T_{1,n}$ in the first block, so as to turn them on. The charges generated in the photodetecting elements $P_{k,n}$ of the first block are transferred to and stored in the wiring capacitances CL. By the charges stored in the wiring capacitances CL, the potential in the common signal lines 104 is varied. The varied voltages are time-sequentially introduced onto an output line 107 by successively turning on analog switches SWn in the drive IC 105. Further, in response to gate pulses $\Phi G2$ to $\Phi Gk$, the switching elements $T_{2,1}$-$T_{2,n}$ to $T_{k,1}$-$T_{k,n}$ in the second to k-th blocks are turned on, so that the charges of the photodetecting elements are transferred for every block. Thus, by simultaneously controlling the "n" number of switching elements every block, the signals of the "n" number of photodetecting elements are introduced in parallel to the drive IC 105. Then, by successively reading, every block, the potentials of the common signal lines 104 that are caused by the transferred charges produce an image signal for one line in the main scan direction on an original document. The original is moved by means of a document feed means (not shown), such as rollers, and the sequence of the operations as stated above is repeated. Finally, image signals of the whole document are obtained (Japanese Patent Application Unexamined Publication No. Sho. 63-9358). In addition, a switch RS is provided for removing the residual charge from the wiring capacitance CL, thereby to reset the capacitance CL.

In the operation of the image sensor for obtaining dark and halftone image signals, when the switching elements $T_{k,n}$ are turned on and off every block by the gate pulses $\Phi Gk$ from the TFT controller 106, the output signals of the photodetecting elements $P_{k,n}$ in several blocks after starting the gating operation tend to increase to be larger (in absolute value) than the output signals of the photodetecting elements in the subsequent blocks, as shown in FIG. 6. The tendency is marked when the operation is repeated under high temperature and high humidity conditions. This fact has been confirmed by a lot of experiments for reliability. In an experiment, the control wires G1 to G4 corresponding to the 1st to 4th blocks were disconnected, and the gating operation was started from the 5th block. An output signal increase tendency, which resembles that for the 1st to 4th blocks, was observed in the output signals of the photodetecting elements in the 5th block and the subsequent ones, as shown in FIG. 7.

The phenomenon of the signal output increase arises from the fact that in the initial several blocks after starting the gating operation, when gate pulses are applied to the control wires Gk, part of charges traveling through the signal transfer wires are stored in the interlayer insulating film (not shown) where the control wires Gk and the signal transfer wires 103 intersect, and apparently increased charges are transferred. Particularly, in the long-time operation under high temperature and high humidity conditions, the above phenomenon markedly appears because the dielectric constant of the interlayer insulating film is increased.

Thereafter, as the switching elements $T_{k,n}$ in the subsequent blocks become conductive in turn, the charge in the interlayer insulating film becomes saturated, while the amount of charge stored anew becomes reduced. The signal output read at the drive IC 105 approaches the amount of charge generated by the photodetecting elements $P_{k,n}$.

In FIGS. 6 and 7, the characteristics were measured in the operation of reading dark output by the image sensor as stated above for about 100 hours and at a temperature of 85° C. and a humidity of 85%. The curves show that the increase of the signal output is observed in the initial stage. The figures are exclusive of noise levels.

As seen from the foregoing description, in the TFT drive image sensor, the signal output apparently increases in the initial several blocks after the gating operation starts. The image signal read does not exactly represent the amount of charge generated by the photodetecting elements $P_{k,n}$. Further, the increase of the signal output would reduce the prescribed lifetime of the sensor, leading to poor reliability of the sensor.

SUMMARY OF THE INVENTION

The present invention has been made in view of the above circumstances and has an object to provide an image sensor of the TFT drive type which suppresses the increase of the signal outputs of the photodetecting elements in the initial several blocks after the gating operation starts when gate pulses are applied to the switching elements of every block.

Another object of the invention is to provide a method of driving an image sensor of the TFT drive type which suppresses the increase of the signal outputs of the photodetecting elements in the initial several blocks after the gating operation starts when gate pulses are applied to the switching elements of every block.

An image sensor according to the present invention comprises an array including a plurality of linearly arranged blocks each comprising n photodetecting elements, switching elements respectively connected in series to the photodetecting elements, control wires, provided respectively in connection with the blocks, for turning on the switching elements for each block, signal transfer wires connected to a drive IC for signal detection, the signal transfer wires being laid out crossing the control wires with an interlayer insulating film layered therebetween, and at least one dummy control wire being laid out crossing the signal transfer wires through the interlayer insulating film and connected to pulse applying means.

Further, a method of driving an image sensor according to the present invention comprises the steps of providing a plurality of blocks each consisting of n photodetecting elements, applying a pulse to a dummy control wire formed crossing signal transfer wires with an interlayer insulating film layered therebetween, rendering switching elements connected to the photodetecting elements conductive for every block by applying gate pulses to control wires, transferring charges generated in the photodetecting elements to wiring capacitances of the signal transfer wires for every block; and reading the charges transferred time-sequentially by a drive IC for signal detection.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention. In the drawings.

DETAILED DESCRIPTION OF THE PREFERRED EMBODIMENT

A preferred embodiment will be described with reference to the accompanying drawings.

Figure 1:
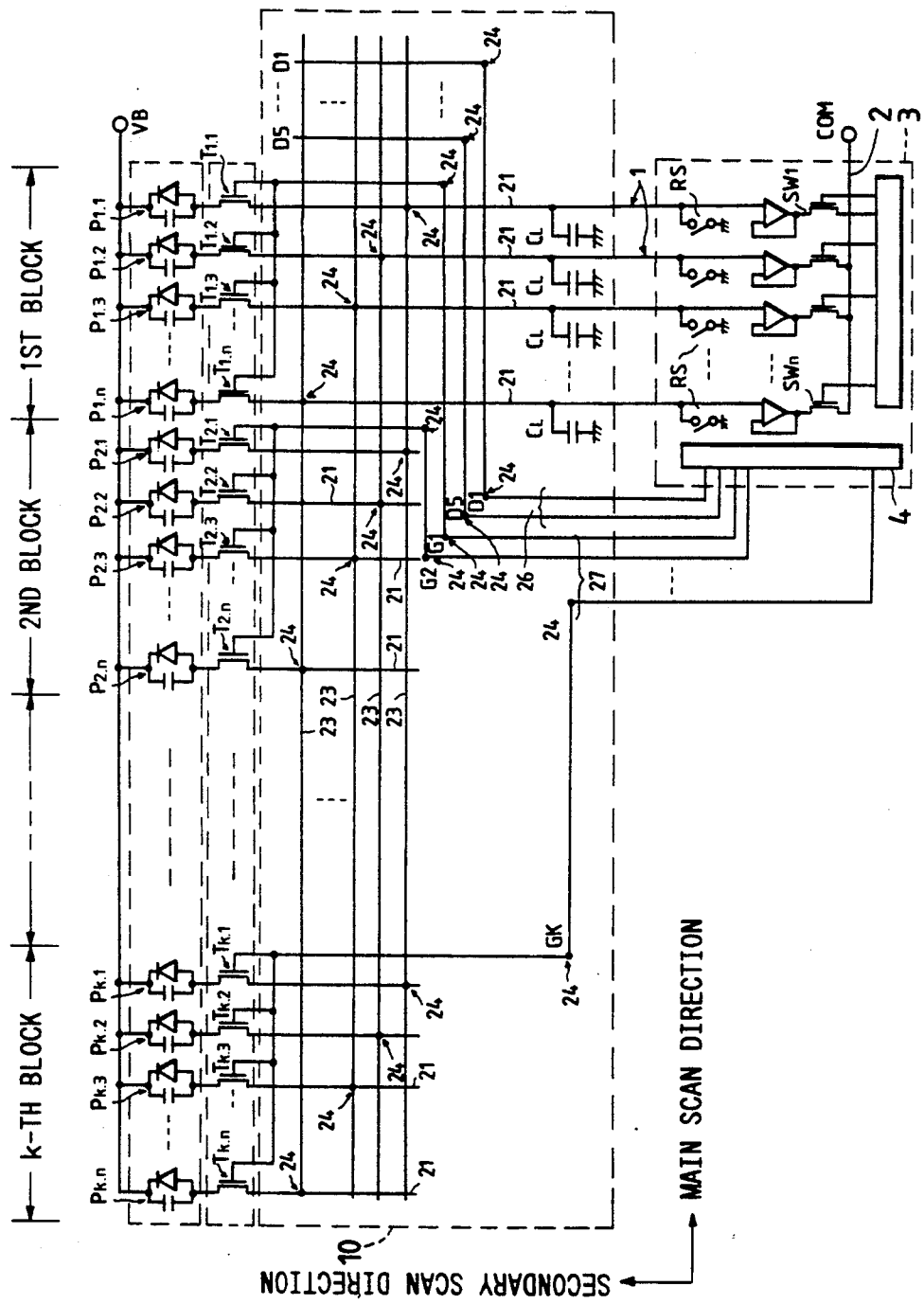
FIG. 1 is an equivalent circuit diagram showing an image sensor according to an embodiment of the invention.

An image sensor according to the present embodiment, as illustrated in FIG. 1 showing its equivalent circuit, comprises a photodetecting element array including 40 blocks of photodetecting elements P ($P_{1,1}$ to $P_{40,64}$) each block consisting of 64 photodetecting elements P, switching elements $T_{k,n}$ (k=1 to 40, n=1 to 64) respectively coupled with the photodetecting elements $P_{k,n}$ (k=1 to 40, n=1 to 64) and serving as a charge transfer section, a multilayered wiring section 10 containing signal transfer wires 1, dummy control wires 26, and control wires 27, and a drive IC 3. Upon conduction of the switching elements $T_{k,n}$, charges generated by the photodetecting elements P are transferred every block through the signal transfer wire structure 1. The drive IC 3 drives an image sensing section so that variations of potential caused by the charges transferred to the signal transfer wire structure 1 are time-sequentially picked up onto an output line 2 (COM).

In the embodiment, each photodetecting element has a thin film sandwich structure in which a metal electrode made of chromium and a transparent electrode made of ITO sandwich a photoconductive member made of amorphous silicon.

Figure 2:
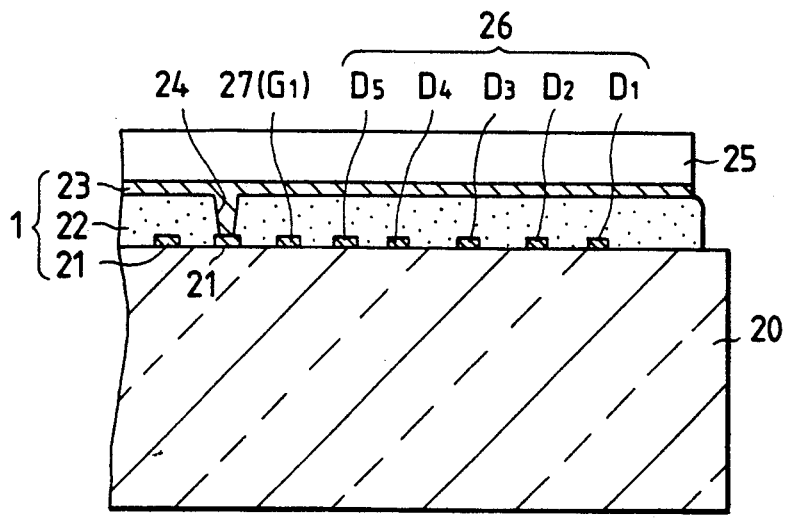
FIG. 2 is a partial cross sectional view showing a part of a multi-layered wire structure of the image sensor of FIG. 1.

As shown in FIGS. 1 and 2, the signal transfer wire structure 1 has a thin-film structure where 64 vertical wires 21 arrayed every block and extending in the secondary or vertical scan direction, an interlayer insulating film 22, and 40 horizontal wires 23 extending in the main scan direction are layered on an insulating substrate 20 in this order. The signal transfer wire structure 1 of the first block contains only the vertical wires 21. The vertical wires 21 and the horizontal wires 23 are interconnected at desired locations (contact holes 24 in FIG. 1) through contact holes formed in the interlayer insulating film 22, thereby forming a matrix wiring structure. A protecting film 25 is formed on the signal transfer wire structure 1.

Additionally formed on the insulating substrate 20 are the control wires 27 (Gk) equal in number to the blocks, and a plurality of (five in this embodiment) dummy control wires 26 (D1 to D5) located outside the control wires 27, which cross the horizontal wires 23 serving as part of the signal transfer wire structure 1 with the interlayer insulating film 22 layered therebetween like the control wires 27. The dummy control wires 26 and the control wires 27 are connected to the bits of a TFT control circuit 4 in the order of D1, . . . , D5 and G1, . . . , G40, through which gate pulses are sequentially applied. The dummy control wires 26 and the control wires 27 include vertical and horizontal wires, like the signal transfer wire structure 1. In FIG. 1, the vertical lines of the dummy control wires 26 and the control wires 27 are formed when the same metal as that of which the vertical wires 21 is patterned. Further, the horizontal lines are formed when the same metal as that of which the horizontal wires 23 is patterned. The vertical and horizontal lines are interconnected through the contact holes 24 of the interlayer insulating film 22 into a matrix structure.

Each switching element T has a thin-film multilayered structure as in the photodetecting element P, and has a gate electrode G, a source electrode S, and a drain electrode D. The drain electrode D is connected to the photodetecting element P, and the source electrode S is connected to the common signal line. The gate electrodes G of the switching elements $T_{k,n}$ are respectively connected to the control wires Gk (k=1 to 40) for each block. With the application of voltage VG from the TFT control circuit 4, the switching elements are turned on and off for each block. The charges generated in the 64 photodetecting elements P are successively transferred in parallel to the wiring capacitances CL of the signal transfer wire structure 1.

Figure 3:
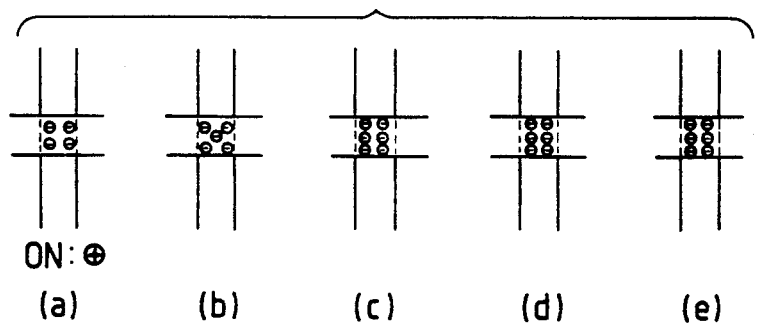
FIGS. 3(a) through 3(e) are diagrams showing a variation of the capacitance caused in the insulating layer at each of the intersections of the dummy control wires and the signal transfer wires.

Next, the operation of the dummy control wires 26 will be described with reference to FIGS. 3 and 4.

Before application of the gate pulses for rendering the switching elements $T_{k,n}$ conductive for each block, the TFT control circuit 4 applies the same pulses as the gate pulses to the dummy control wires 26. After the pulses are sequentially applied to the five dummy control wires 26, the gate pulses for rendering the switching elements $T_{k,n}$ conductive for each block are sequentially applied to the control wires 27.

FIGS. 3(a) through 3(e) are diagrams showing a model of a variation of the capacitance caused in the insulating film 22 at each of the intersections of the dummy control wires 26 and the signal transfer wires 1. After the pulses are sequentially applied to the dummy control wires 26, each of the intersections of the dummy control wires 26 and the signal transfer wires 1 is progressively charged and becomes saturated with charge. In this embodiment, the intersection is saturated with charge from a time point on which the gate pulse has been applied to the third block, and thereafter the amount of charge at the intersection is not changed even if the gate pulses are further applied, as shown in FIGS. 3(a) through 3(e).

Figure 4:
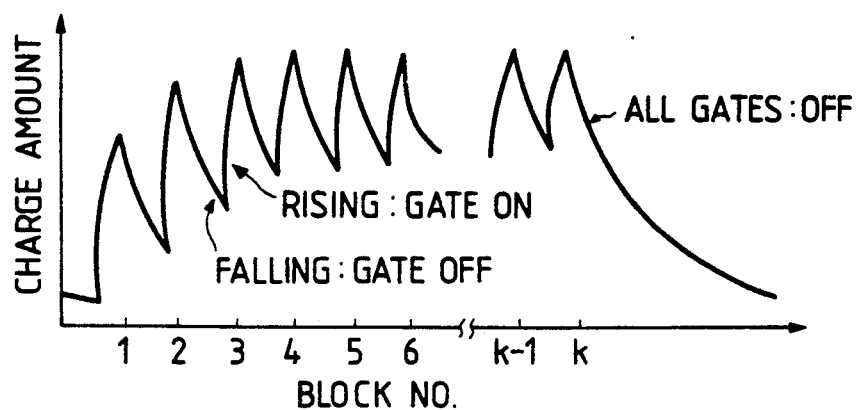
FIG. 4 is a graph depicting a variation of the amount of charge stored in the interlayer insulating layer when gate pulses are sequentially applied to the switching elements.
Figure 5:
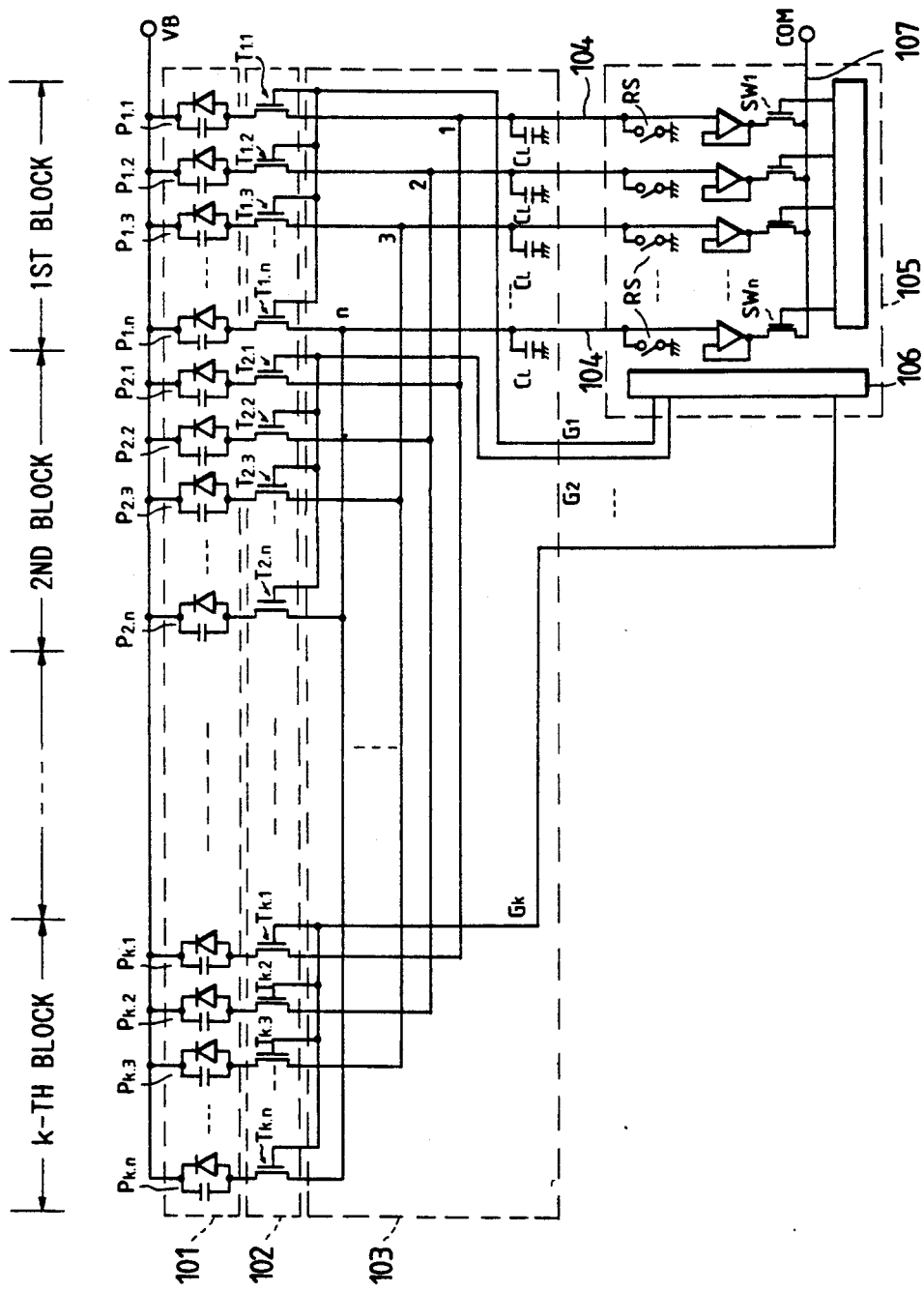
FIG. 5 is an equivalent circuit diagram showing a conventional image sensor.
Figure 6:
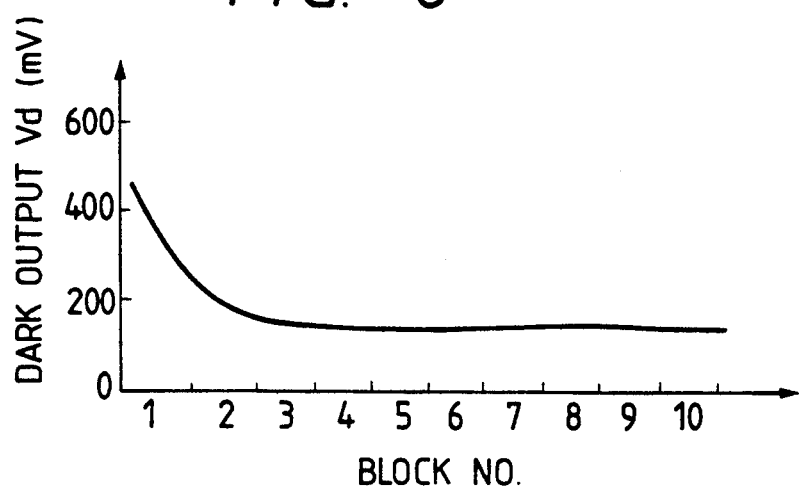
FIG. 6 is a graph showing a variation of the dark output with respect to the initial several blocks after the gating operation starts.
Figure 7:
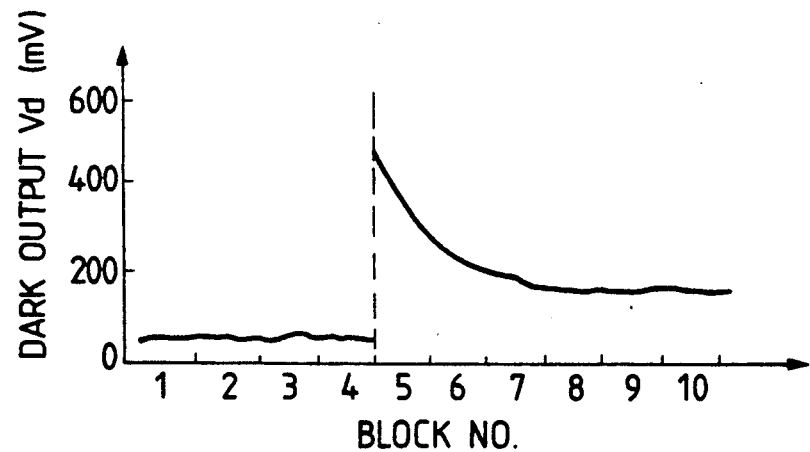
FIG. 7 is a graph showing a variation of the dark output with respect to the blocks when the control wires coupled with the 1st to 4th blocks are disconnected.

The above variation of the amount of charge may be graphically expressed as shown in FIG. 4. As seen, the amount of charge to be stored at the intersection is kept constant, after gate pulses are applied to the control wires in the third and subsequent blocks. After the gate pulse is applied to the control line for the k-th block, the charge stored is discharged to reset the intersection.

In the embodiment as stated above, the dummy control wires 26 are located outside the control wires 27, but may be formed at any location where they cross the signal transfer wire structure 1 through the interlayer insulating film 22. For example, the wires may be located between the control wires 27.

Thus, in the present embodiment, before application of the gate pulses for rendering the switching elements $T_{k,n}$ conductive for each block, the TFT control circuit applies pulses to the dummy control wires 26, thereby to saturate, with charge, the intersections of the signal transfer wire structure 1 and the control wires 27. Therefore, the gate pulses do not charge the intersections.

Also in the present embodiment, with use of five dummy control wires 26, the signal output increase in each block is negligible in the characteristic. An experiment showed the maintenance of the initial characteristic after the image sensor has been operated for 300 hours at a high temperature and a humidity (85° C. and 85% RH).

While in the embodiment as mentioned above, five dummy control wires 26 are provided, the number of them may be properly selected so as not to increase the signal output in the blocks of the image sensor.

As described above, the gate pulses for rendering the switching elements conductive do not charge the intersections between the control wires and the signal transfer wire structure. Therefore, the amounts of charges generated by the photodetecting elements can be accurately detected in the form of charge signals, and hence an exact image read is ensured. Accordingly, the S/N ratio of the image sensor is improved.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

I claim:

1. An image sensor comprising:
    an array including a plurality of linearly arranged blocks each comprising n photodetecting elements;
    switching elements respectively connected in series to the photodetecting elements;
    control wires, provided respectively in connection with the blocks, for turning on the switching elements for each block;
    signal transfer wires connected to a drive IC for signal detection, said signal transfer wires being laid out crossing said control wires;
    an interlayer insulating film layered between said control wires and said signal transfer wires;
    pulse applying means for applying gate pulses; and
    at least one dummy control wire being laid out crossing said signal transfer wires, said interlayer insulating film layered between said dummy control wire and said signal transfer wires, said dummy control wire being connected to said pulse applying means.

2. The image sensor according to claim 1, wherein said dummy control wire is laid out outside said control wires.

3. The image sensor according to claim 1, wherein said dummy control wire is laid out between control wires.

4. The image sensor according to claim 1, wherein said signal transfer wires include horizontal wires extending in a main scan direction and vertical wires extending in a secondary scan direction, and said dummy control wire crosses said horizontal wires through the interlayer insulating film.

5. The image sensor according to claim 1, wherein said control wires are connected to said pulse applying means.

6. The image sensor according to claim 1, wherein a pulse is applied to said dummy control wire before gate pulses are applied to said control wires.

7. A method of driving an image sensor comprising the steps of:

providing a plurality of blocks each comprising n photodetecting elements and having an associated control wire;

providing a plurality of signal transfer wires connected to said photodetecting elements;

applying a pulse to a dummy control wire, said dummy control wire being formed crossing said signal transfer wire with an interlayer insulating film layered between said dummy control wire and said signal transfer wires;

rendering switching elements connected to the photodetecting elements conductive for each block by applying gate pulses to the control wires;

transferring charges generated in the photodetecting elements to wiring capacitances of the signal transfer wires for each block; and reading the charges transferred time-sequentially by a drive IC for signal detection.

8. The method according to claim 7, wherein both the gate pulses for said control wires and the pulse for said dummy control wire are respectively supplied from a single pulse supplying means.

* * * * *